Aug. 18, 1959    R. E. SCHWETTMAN    2,899,807
GEARED FLEXIBLE SHAFT COUPLINGS
Filed March 6, 1958    2 Sheets-Sheet 1
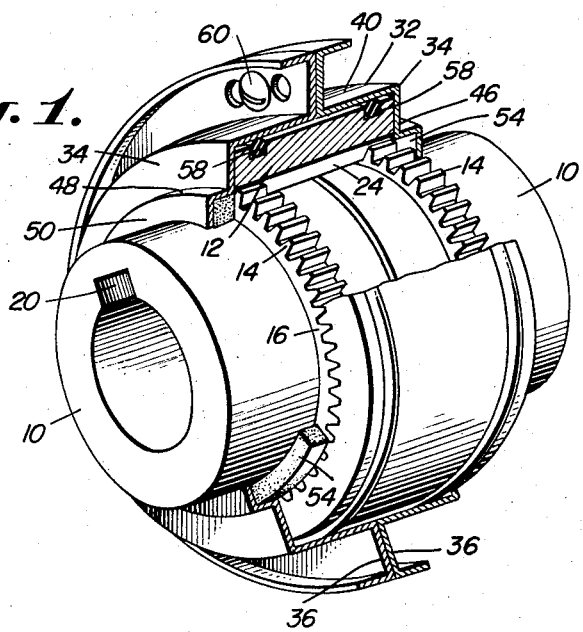
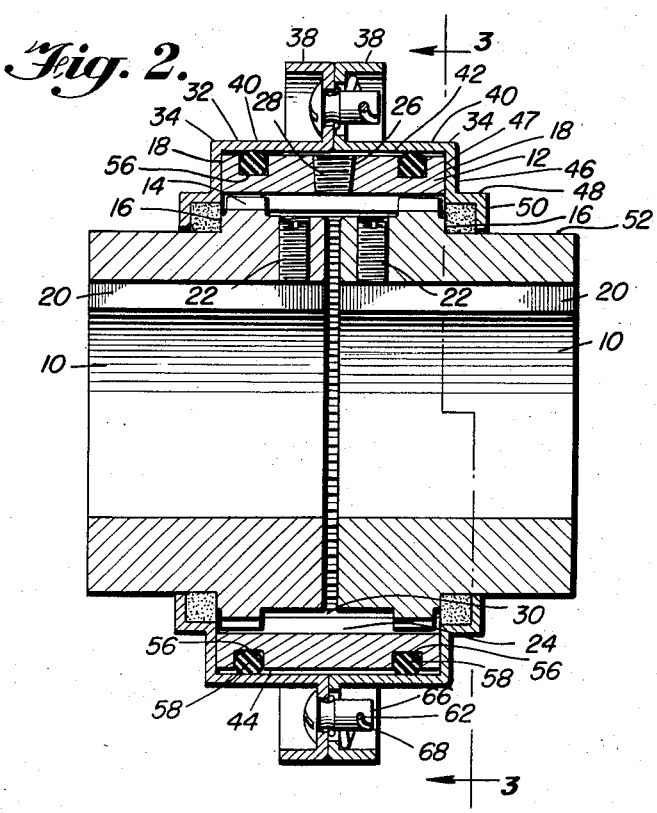

Aug. 18, 1959  R. E. SCHWETTMAN  2,899,807
GEARED FLEXIBLE SHAFT COUPLINGS
Filed March 6, 1958  2 Sheets-Sheet 2

United States Patent Office 2,899,807
Patented Aug. 18, 1959

2,899,807
GEARED FLEXIBLE SHAFT COUPLINGS

Roy E. Schwettman, Indianapolis, Ind., assignor to Link-Belt Company, a corporation of Illinois Application March 6, 1958, Serial No. 719,594

7 Claims. (Cl. 64—9)

This invention relates to couplings for joining two rotatable shafts, and deals more particularly with flexible couplings of the type having a pair of geared hub elements which cooperate with an internally geared sleeve element for the transmission of power from one rotating shaft to another.

An object of the present invention is to provide a coupling of the type referred to composed of a minimum number of elements which are capable of being economically manufactured, quickly assembled into completed couplings, and easily installed in a particular application.

A further object of this invention is to provide a geared flexible coupling wherein the working surfaces are maintained immersed in lubricant and having improved sealing means for preventing leakage of lubricant from the coupling.

Another object of this invention is to provide a geared flexible coupling wherein the internally geared sleeve element is separate from the cover, the cover transmitting no power and being formed of two relatively light halves joined together by quick acting fastening means to permit simple and fast assembly and disassembly of the cover to and from the coupling.

Another object of this invention is to provide a geared flexible coupling having a cover formed in two halves, a separate sealing device between the cover and each gear element, and a separate sealing element between each cover half and the outside surfaces of the sleeve element, such arrangement eliminating the need for a lubricant-tight seal between the abutting faces of the cover halves.

Other objects and advantages of the invention will be apparent during the course of the following description.

Figure 3:
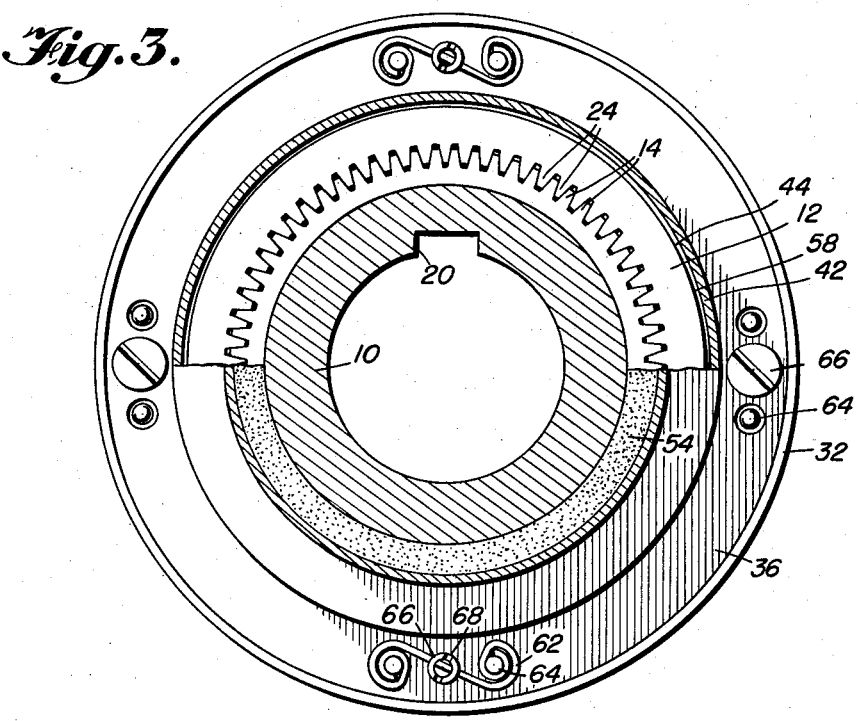
Figure 4:
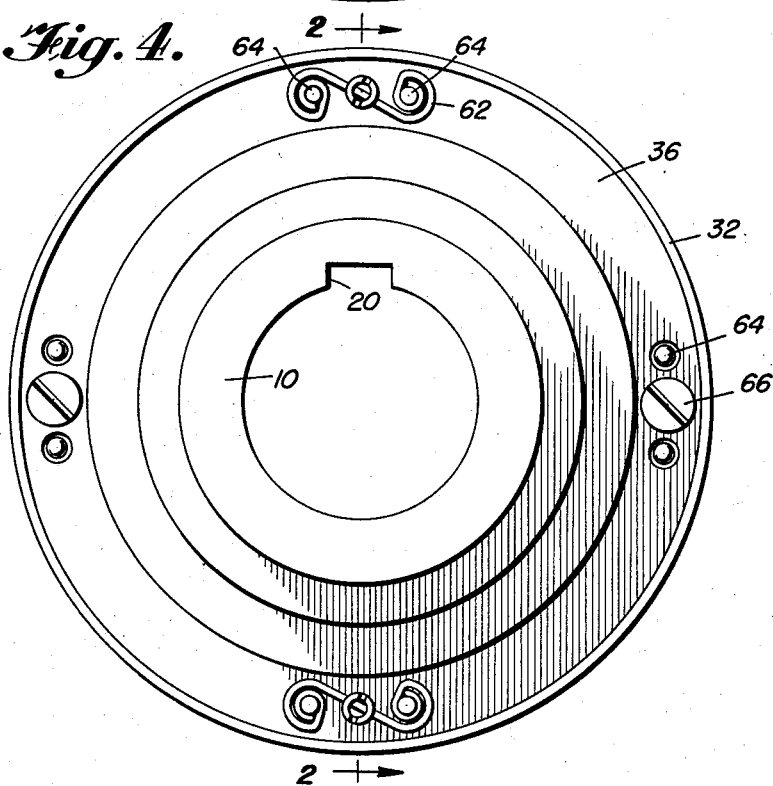

In the accompanying drawings forming a part of this specification and in which like numerals are employed to designate like parts throughout the same, Figure 1 is a perspective view of a geared flexible coupling embodying the present invention with certain parts being broken away to disclose more clearly the internal construction, Figure 2 is a vertical sectional view of the coupling of Fig. 1 taken on an axial plane, Figure 3 is a vertical sectional view taken on line 3—3 of Fig. 2, and Figure 4 is an end elevational view of the coupling shown in Fig. 1.

In the drawings, wherein for the purpose of illustration is shown the preferred embodiment of this invention, and first particularly referring to Figs. 1 and 2, there is shown a coupling for joining two rotatable shafts wherein the principal power transmitting elements comprise two hub members 10 substantially axially aligned, and an outer sleeve member 12 surrounding at least a portion of each of the hub members 10. Each of the hub elements 10 is formed with a circumferential row of teeth 14 on the outer surface thereof. Axially outwardly from the row of teeth 14 each hub is formed with a shoulder 16 which is substantially radially aligned with a respective one of the ends 18 of the sleeve 12, such shoulder serving a purpose hereinafter described. Each hub 10 is also provided with a keyway 20 and a set screw 22 for securing the hub to the shaft (not shown) on which it is mounted.

The sleeve 12 has formed in its bore a series of teeth 24 which mesh with each of the rows of teeth 14 on each of the hubs 10 and act to transmit rotating power from one of the hub elements 10 to the other. For simplicity of manufacture, the sleeve 12 may be made from a steel tubing with the teeth 24 being formed therein by a broaching operation. Referring to Fig. 3, it will be observed that the teeth 14 and 24 in the present instance resemble ordinary gear teeth, and it is preferable that these teeth mesh loosely so as to permit slight angular displacement of the axes of the hubs 10 relative to the axis of the sleeve 12 and thereby allow for slight axial misalignment of the rotating shafts joined by the coupling. The sleeve 12, also, is provided with a threaded opening 26, normally closed by a plug 28, for supplying lubricant to the space 30 between the hub members 10 and the sleeve 12.

To hold the sleeve 12 in proper axial position relative to the hubs 10, and also to aid in retaining lubricant within the space 30, the coupling is provided with a cover 32 which encloses the sleeve 12 and those portions of the hubs 10 positioned within the sleeve 12. Sealing means, as hereinafter described, cooperating with the cover 32 are provided to assure proper lubricant retention.

The cover 32 is composed of two separate sections, preferably two similar halves, 34 which engage at a point intermediate the ends 18 of the sleeve 12. In the present instance, each half section 34 is formed with a radially outwardly directed flange 36 which abuts the corresponding flange 36 of the other half section 34 at a location radially outwardly from the middle of the sleeve 12. The radially outer ends of the flanges 36 are preferably each bent at right angles to form axially extending portions 38 which serve as safety shields for the fastening elements, hereinafter described, used to connect the two half-sections. Each half-section 34 is also formed to provide a circumferential portion 40 extending axially outwardly from the radially inner edge of the flange 36 and having a radially inner surface 42 closely spaced in relation to the radially outer surface 44 of the sleeve 12. From the axially outer end of the circumferential portion 40 each half section 34 is bent perpendicularly to form a radially inwardly directed portion 46 having an inner surface 47 which engages the associated end 18 of the sleeve 12.

From the radially inner edge of the inwardly directed portion 46, each cover half 34 is bent perpendicularly to form an axially outwardly directed offset portion 48. From the axially outer edge of the offset portion 48, each cover half 34 is bent perpendicularly to form a radially inwardly directed portion 50, the inner edge of which is closely spaced from the peripheral surface 52 of the corresponding hub element 10.

The offset portion 48 and the radial portion 50 of each cover half 34, and the radial shoulder 16 and the peripheral surface 52 of the hub 10 define a recess in which an annular sealing element 54 is placed. This sealing element serves to retain lubricant between the cover and each corresponding hub element 10 and is preferably of such cross section so as to have two surfaces engaging both the hub 10 and the cover half 34. The annular sealing element 54 is preferably made of a compressible fibrous material, such as felt, so as to permit a degree of relative movement between the hub 10 and the associated cover half 34 while maintaining a fluid-tight seal therebetween.

Sealing means are also provided between the sleeve 12 and each cover half 34 to prevent the escape of lubricant from the cover at the point of coengagement of the cover halves. Preferably this seal is effected by forming the sleeve 12 with two grooves 56 in the radially outer surface thereof, one groove being positioned to each side of the location of engagement between the flanges 36, and by providing O-rings 58, or other compressible annular sealing elements, disposed in each of the grooves 56 which sealingly engage the inner surfaces 42 of the circumferential cover portions 40. It will be noted that this form of seal between the sleeve 12 and the cover prevents the escape of lubricant from the space 30 to the location at which the cover halves are joined. Therefore, it is evident that the two halves need not be joined with a lubricant-tight seal therebetween.

Fastening means are provided for holding the two cover halves 34 together; however, in view of the fact a lubricant-tight seal is not required between the cover halves at the point of engagement, it is preferable that a quick acting type fastener be used in order to facilitate the assembly and disassembly of the cover to and from the coupling. As illustrated, one such fastener 60 includes a spring element 62 fastened to one of the flanges 36 by rivets 64, and a headed stud 66 which passes through both of the flanges 36 and has a cam shaped slot 68 formed in the end thereof which engages the spring element 62 and forms a moderately tight connection therewith upon the stud element 66 being given a quarter turn. Four of these fasteners are used in the illustrated coupling and are equally spaced about the flanges 36 in staggered relationship with respect to the particular flange to which the spring element 62 is connected. Thus, it will be observed that each of the cover halves 34 is similar in construction and interchangeable with the other half section, thereby reducing the number of different parts required in making up a completed coupling. It will be appreciated, however, that ordinary bolts and nuts may be employed, if desired, to fasten the two cover halves together.

It is to be understood that the form of this invention herewith shown and described is to be taken as the preferred example of the same, and that various changes in the shape, size, and arrangement of parts may be resorted to without departing from the spirit of the invention or the scope of the subjoined claims.

Having thus described the invention, I claim:

1. A flexible shaft coupling comprising a pair of hubs substantially axially aligned and each having a circumferential row of power transmitting elements formed on the radially outer surface thereof, an outer sleeve having a cylindrical exterior surface, said sleeve surrounding at least a portion of each of said hubs and having power transmitting elements formed on the radially inner surface thereof which interengage the power transmitting elements formed on said hubs, a cover formed of two separate sections for enclosing said sleeve and the hub portions positioned within said sleeve, and seal means between each of said cover sections and said cylindrical surface of said sleeve and between said cover and each of said hubs for retaining lubricant within the space between said sleeve and said hubs.

2. A flexible shaft coupling comprising a pair of substantially axially aligned hubs each having a circumferential row of teeth formed on the radially outer surface thereof, an outer sleeve surrounding at least a portion of each of said hubs and having teeth formed on the radially inner surface thereof which mesh with the teeth formed on said hubs, said sleeve having two axially spaced grooves formed in the radially outer surface thereof, a cover formed of two separate sections for enclosing said sleeve and the hub portions positioned within said sleeve, said two cover sections being joined together at a location disposed between said two grooves, a compressible annular sealing element disposed in each of said grooves for effecting a seal between said sleeve and each of said cover sections, and seal means between each of said cover sections and a corresponding one of said hubs.

3. A flexible shaft coupling as defined in claim 2 further characterized by said seal means comprising an annular ring of compressible material, each of said hubs being formed with a radial shoulder substantially aligned with the corresponding end of said sleeve, and each of said cover sections having a radially inwardly projecting portion adjacent the corresponding end of said sleeve formed with an axially outwardly extending offset portion and a second radially inwardly projecting portion which cooperates with one of said radial shoulders to provide a recess for receiving said annular ring.

4. A flexible shaft coupling comprising two hub members, a sleeve surrounding at least a portion of each of said hub members, means for transmitting power from one hub to the other through said sleeve, a cover including two separate sections which engage at a desired location intermediate the ends of said sleeve, and seal means disposed on either side of said location of engagement between said sleeve and a corresponding cover section for preventing the passage of lubricant from the interior of said coupling to said location of engagement.

5. A flexible shaft coupling comprising two hub members, a sleeve surrounding at least a portion of each of said hub members and having two axially spaced grooves formed in the radially outer surface thereof, means for transmitting power between said hubs through said sleeve, a cover including two separate sections which engage at a location intermediate said grooves, and a compressible annular sealing element disposed in each of said grooves for effecting a seal between said sleeve and a corresponding cover section to prevent the passage of lubricant from the interior of said coupling to said location of engagement.

6. A flexible shaft coupling comprising two hub members, a sleeve surrounding at least a portion of each hub member and having two axially spaced grooves formed in the radially outer surface thereof, means for transmitting power between said hubs through said sleeve, a cover including two separate sections each having a radially outwardly extending flange which engages the other of said flanges at a location intermediate said grooves, a compressible annular sealing element disposed in each of said grooves for effecting a seal between said sleeve and a corresponding cover section for preventing the passage of lubricant from the interior of said coupling to said location of engagement, and fastening means for holding said flanges together.

7. A flexible coupling as defined in claim 6 further characterized by said fastening means comprising a plurality of quick acting fasteners, each of said fasteners including a spring element and a stud element having a cam shaped slot in the end thereof which cooperates with the spring element to form a connection therewith.

References Cited in the file of this patent

UNITED STATES PATENTS

| 2,595,393 | Langdon | May 6, 1952 |
| 2,787,894 | Hamann | Apr. 9, 1957 |

FOREIGN PATENTS

| 413,953 | Great Britain | July 26, 1934 |